Dec. 7, 1965 G. A. MOBLEY Re. 25,938

CONTAINER

Original Filed Feb. 25, 1963

INVENTOR.
GEORGE A. MOBLEY
BY
ATTORNEY

United States Patent Office

Re. 25,938
Reissued Dec. 7, 1965

25,938
CONTAINER

George A. Mobley, Spartanburg, S.C., assignor to Milliken Tetra Pak, a division of Clemson Industries, Inc., Pacolet, S.C., a corporation of Delaware Original No. 3,166,226, dated Jan. 19, 1965, Ser. No. 260,594, Feb. 25, 1963. Application for reissue Apr. 29, 1965, Ser. No. 457,902
3 Claims. (Cl. 229—7)

Figure 1:
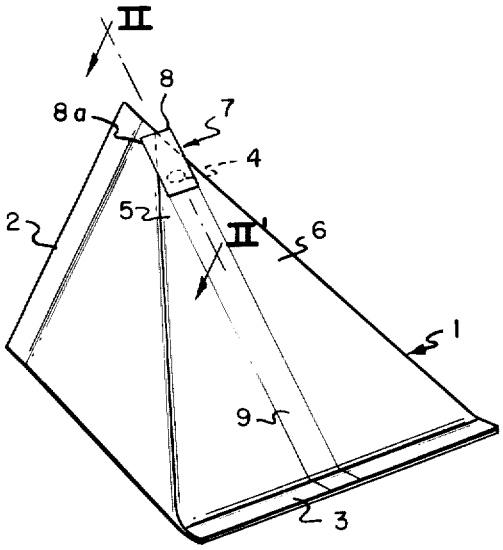

Matter enclosed in heavy brackets [ ] appears in the original patent but forms no part of this reissue specification; matter printed in italics indicates the additions made by reissue.

This invention relates to liquid filled sealed tetrahedron containers provided with means for obtaining access to the contents thereof.

Tetrahedron containers are rapidly gaining acceptance as containers for a wide variety of liquids, despite certain difficulties associated with the use of the containers, because of the substantial economies realized by the use thereof instead of the conventional rectangular containers. One of the problems associated with the use of tetrahedron containers is that by the very nature by which the containers are formed, it is difficult to provide means for obtaining access to the contents of the container.

One means that has been recommended is to snip off one corner of the container with scissors. Because of the obvious limitations involved in this manner of opening the container, containers have been formed with slit or tearable areas. See, for example, U.S. Patent Nos. 2,952,394 and 3,038,649. With containers in which the corner is intended to be torn off, there is always the danger of spilling some of the contents of the container during the tearing operation. Also, a container having a weaker portion at a seal is more susceptible to leakage if the container is subjected to any pressure or stress.

Another problem associated wtih providing means for obtaining access to the contents is that whatever means is employed must not be such as to expose the contents of the container to an unacceptable material when the contents of the container is an edible product. This substantially precludes the use of any arrangement utilizing moisture sensitive or pressure sensitive adhesives for such end uses.

It is therefore an object of this invention to provide a liquid filled sealed tetrahedron container bearing means to obtain access to the contents thereof free from the above-described limitations and objections.

Another object is to provide such a container whose access means is not susceptible to leakage at the access point.

Another object is to provide such a tetrahedron container which can be produced on equipment presently being employed for producing tetrahedron containers not bearing such an access means.

Still another object is to provide a tetrahedron container having access means adapted for the insertion of a drinking straw into the container.

Another object is to provide such a tetrahedron container in which access to the contents thereof can readily be gained by young children without instruction.

A further object is to provide such a container whose access means is clearly visible.

Other objects will be apparent to those skilled in the art to which this invention pertains.

According to this invention there is provided liquid filled sealed tetrahedron containers having means for obtaining access to the contents thereof by an opening at the uppermost area of a wall thereof, the opening being covered by a tape sealed to the container wall around the opening by the bonding of the thermoplastic material forming one face of the tape to the outer face of the opening bearing wall, the tape having at least one corner of the end portion which is uppermost unsealed to the container wall to provide a pull tab with which to remove the tape from the container, the unsealed corner or corners of the unsealed portion extending outwardly away from the walls of the container.

Liquid filled tetrahedron containers can be produced employing equipment as described in U.S. Patent Nos. 2,738,631; 2,741,079; 2,784,540; 2,821,250; 2,832,271; 2,869,299; and 2,895,731. If the container is to be formed and filled under aseptic conditions, the procedures disclosed in U.S. Patent Nos. 2,918,770; 2,928,219; 3,063,211 and 3,063,845 can be followed. The tab seals will ordinarily be provided by this apparatus between the point where the paper stock is unrolled and the point where the partially formed container is filled with liquid, e.g., in the manner described herein and as described in detail in copending application S.N. 260,587 filed on even date herewith claiming apparatus for producing the novel containers of this invention.

The containers of this invention are formed from laminated stock material, the innermost lamina of which is a layer of thermoplastic material substantially impervious and inert to the contents of the container, such containers being now well known in the art. The laminated material used to form these containers is ordinarily one or more layers of paper laminated to layers of polyethylene or polypropylene so that the face of the laminated material which will form the inner face of the container will present a liquid impervious face to the contents. The outermost lamina is ordinarily moisture resistant, either by being formed of a layer of wet strength paper or a lamina of thermoplastic materials such as wax or polyethylene, or both. The container will bear the conventional transverse sealed seams and longitudinal butt, i.e., inside face to inside face, or lapped seam. At the apex which is uppermost of the wall which faces upward when the container rests on the opposite wall, there is provided an access aperture in the wall. This will ordinarily be a small round hole which, if the container is a pint or half-pine size, will be about the size which will receive a drinking straw. The opening is sealed by a tape covering the opening and bonded to the outer face of the portion of the wall surrounding the opening by the bonding of the portion of the thermoplastic material forming at least one face of the tape to the outermost lamina of the container, thus providing a liquid tight seal. To insure that the tape can be removed properly and readily, there is provided an end portion on the tape, preferably the uppermost portion, which is not sealed to the container wall, thus providing a pull tab. At least one corner of the unsealed end portion extends outwardly away from the container walls. The tape is ordinarily formed of paper laminated to polyethylene or paper impregnated with polyethylene, polypropylene, or wax.

This invention is illustrated by the accompanying drawings, in which

Figure 2:
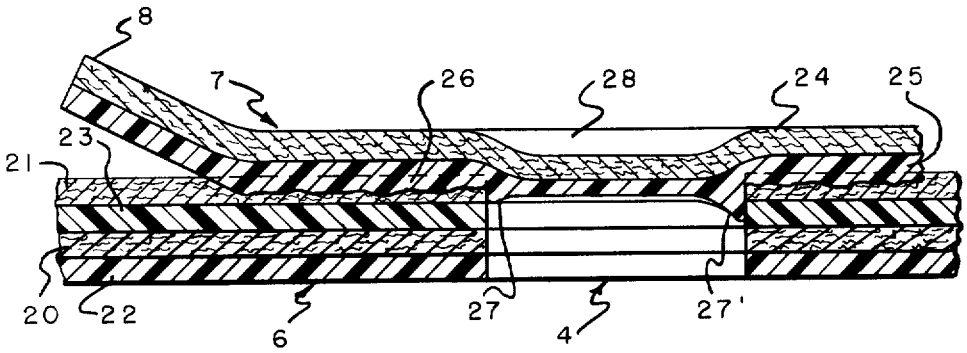

FIG. 1 is a perspective view of a sealed tetrahedron container of this invention having a tape sealed opening in a wall thereof; and FIG. 2 is a highly enlarged cross-sectional view of the opening bearing portion of the wall of the tetrahedron container of FIG. 1, taken along line II–II'.

As shown in FIG. 1, the tetrahedron container 1, having the usual transverse seams 2 and 3, has an opening 4 positioned at the uppermost apex 5 of the wall 6 facing upward when the container 1 rests on the wall opposite of the opening bearing wall 6. The opening 4 is sealed by a tape 7 covering the opening 4 and sealed to the portion of the wall 6 surrounding the opening 4. An end portion 8 or at least one corner 8a thereof of the tape 7 is unsealed to the container to provide a pull tab for removing the tape when access to the contents of the container is desired. The unsealed corner or corners of unsealed end portion 8 extend outwardly from the walls of the container, as shown in FIG. 1, to provide a winged effect to the tab, thus making it easy to locate, an important feature when the container is used by young children or persons with poor vision. An optional feature is an uncoated strip 9 along the container wall 6 when the wall is coated with wax or other material which would tend to interfere with the sealing of the tape 7 to the wall 6.

Details of the construction of the container wall 6 and the tape 7 of the container 1 are shown in FIG. 2 along with the manner in which the tape is sealed to the wall The wall 6 shown in FIG. 2 is a laminated paper consisting essentially of two layers 20 and 21 of wet strength paper alternated by two layers 22 and 23 of polyethylene, one of which layers 22 forms the interior face of the wall 6. The tape 7 covering the opening 4 is a laminated tape having an outer paper layer 24 and an inner polyethylene layer 25. The seal between the tape 7 and the paper lamina 21 of wall 6 in the container 1 shown in the drawings was achieved by heat sealing which caused some of the polyethylene lamina 25 of the tape 7 to penetrate into the outer portion 26 of the most exteriorly positioned paper lamina 21 of wall 6 so that the polyethylene is infused around the fibers in that portion of the lamina. This can be seen when the tape is pulled from the container. A thin layer of fibers from the paper lamina 21 can be seen imbedded in the polyethylene lamina 25. The heat sealing causes a bead which can be a shallow bead 27 or a deep bead 27' to be formed around the edge of the opening 4. This tends to reduce edge wicking into paper lamina 21 or eliminate such wicking when the bead 27' penetrates deeply enough into the opening 4 to bond with the polyethylene lamina 23 of the wall 6 of the container. This is particularly important if the paper lamina has low wet strength, in which case it is most desirable for the bead to penetrate into the opening 4 until a liquid tight seal is achieved between the innermost positioned polyethylene lamina 22 and bead 27'. The heat sealing causes a recessed portion 28 in the tape 7 as a result of the portion of the tape being drawn into the opening 4. As also shown in FIG. 1, a portion 8 of the tape 7 is left unsealed to the container to provide a pull tab for removing the tape.

While it will be apparent that the containers of this invention can be formed individually by cutting a hole in a sealed conventional tetrahedron container and heat sealing a tape having a polyethylene face over the opening, the containers of this invention are of commercial significance because they can be formed using commercial apparatus presently available for this purpose by incorporating in the apparatus an aperture forming and tape sealing device.

The stock used to make the tetrahedron containers can be formed of a wide variety of laminated products, e.g., a polyethylene, polypropylene, polyvinylchloride, polyvinyl acetate, nylon, polyester, or other thermoplastic film or layers laminated to paper, fabric, aluminum foil, lead foil or other suitable packaging material. The tape used to form the seal over the aperture can be constructed wholly of one of the above thermoplastic materials or it can also be a laminated product like the container stock. Generally, a polyethylene-paper laminated product is preferred for both.

The size and shape of the opening or aperture in the container will depend upon its intended use, i.e., whether or not it is to be used as a pouring opening or as an opening for insertion of a drinking straw. However, a round hole about 3/16" to 3/8" is preferred when the container is a half-pint or pint size containing milk or a soft drink.

The tape can be colored so as to blend or contrast with the container wall and can bear printing such as advertising or instructions on opening the container.

What is claimed is:

1. A liquid filled tetrahedron container formed of laminated material, the innermost lamina of which is a thermoplastic continuous layer substantially impervious and inert to the contents of the container, a wall of which container bears an aperture [through one wall only thereof] for providing access to the contents of the container positioned at about that apex of the wall which is uppermost when the container is resting on the wall opposite the aperture bearing wall, the aperture being sealed by a tape having the surface that faces the container wall being formed of a thermoplastic material, at least a portion of which is infused around at least the outermost lamina of the container to form a liquid tight seal between the tape and the container and a portion of which forms a bead around the edge of the aperture, and with at least one corner of the end portion of the tape which is positioned uppermost with respect to the upright container being unsealed to the container wall and extending outwardly away from the walls of the container, thus providing a readily locatable pull tab with which to remove the tape from the container.

2. The structure of claim 1 wherein the innermost lamina of said container is polyethylene.

3. The structure of claim 2 wherein the surface of said tape facing said container wall is polyethylene.

References Cited by the Examiner

The following references, cited by the Examiner, are of record in the patented file of this patent or the original patent.

UNITED STATES PATENTS 3,038,649 6/1962 Rausing ---------- 229—17

FOREIGN PATENTS 1,222,847 6/1960 France.

THERON E. CONDON, *Primary Examiner.*

J. B. MARBERT, *Assistant Examiner.*